United States Patent
Kudo et al.

(10) Patent No.: US 6,896,922 B2
(45) Date of Patent: May 24, 2005

(54) OIL-COOKED OR BAKED POTATOES

(75) Inventors: Naoto Kudo, Tokyo (JP); Yoji Kameo, Tokyo (JP); Wataru Mizuno, Tokyo (JP)

(73) Assignee: Kao Corporation, Tokyo (JP)

( * ) Notice: Subject to any disclaimer, the term of this patent is extended or adjusted under 35 U.S.C. 154(b) by 381 days.

(21) Appl. No.: 09/985,755

(22) Filed: Nov. 6, 2001

(65) Prior Publication Data

US 2002/0081368 A1 Jun. 27, 2002

(30) Foreign Application Priority Data

Nov. 6, 2000 (JP) ........................................ 2000-337330

(51) Int. Cl.$^7$ .............................. A23D 7/00; A23L 7/01
(52) U.S. Cl. ...................... 426/541; 426/601; 426/637; 426/438; 426/466; 426/523
(58) Field of Search ................................ 426/466, 523, 426/541, 601, 637, 438

(56) References Cited

U.S. PATENT DOCUMENTS

| | | | | |
|---|---|---|---|---|
| 5,514,405 | A | * | 5/1996 | Yokomichi et al. ......... 426/604 |
| 6,004,611 | A | * | 12/1999 | Gotoh et al. ................ 426/612 |
| 6,106,879 | A | | 8/2000 | Mori et al. |
| 6,337,414 | B1 | | 1/2002 | Sugiura et al. |
| 6,689,409 | B2 | * | 2/2004 | DeBonte et al. ............ 426/438 |

FOREIGN PATENT DOCUMENTS

| EP | 0525915 A1 * | 2/1993 |
|---|---|---|
| EP | 0 836 805 | 4/1998 |
| EP | 0 990 391 | 5/2000 |
| JP | 10-127230 | 5/1998 |
| JP | 11-243857 | 9/1999 |
| WO | WO 99/59424 * | 11/1999 |

OTHER PUBLICATIONS

Owen R. Fennema, Food Chemistry 3$^{rd}$ Edition, Marcel Dekker Inc., 1996, p. 959.*
U.S. Appl. No. 09/453,078, filed Dec. 2, 1999, Pending.
U.S. Appl. No. 09/926,741, filed Dec. 11, 2001, Pending.
U.S. Appl. No. 10/061,286, filed Feb. 4, 2002, Pending.
U.S. Appl. No. 09/427,081, filed Oct. 26, 1999, Pending.
U.S. Appl. No. 09/725,571, filed Nov. 30, 2000, Allowed.
U.S. Appl. No. 09/809,192, filed Mar. 16, 2001, Pending.
U.S. Appl. No. 09/900,053, filed Jul. 9, 2001, Pending.
U.S. Appl. No. 09/907,811, filed Jul. 19, 2001, Pending.
U.S. Appl. No. 10/014,356, filed Dec. 14, 2001, Pending.
U.S. Appl. No. 10/014,449, filed Dec. 14, 2001, Pending.
U.S. Appl. No. 10/032,493, filed Jan. 2, 2002, Pending.
U.S. Appl. No. 10/131,188, filed Apr. 25, 2002, Pending.
U.S. Appl. No. 10/238,720, filed Sep. 11, 2002, Pending.
U.S. Appl. No. 10/343,831, filed Feb. 10, 2003, Koike et al.
U.S. Appl. No. 10/343,748, filed Feb. 6, 2003, Koike et al.
U.S. Appl. No. 10/343,742, filed Feb. 6, 2003, Koike et al.
U.S. Appl. No. 10/019,427, filed Dec. 31, 2001, Masui et al.
U.S. Appl. No. 10/009,494, filed Apr. 8, 2002, Masui et al.
Patent Abstracts of Japan, JP 10 127230, May 19, 1998.
Patent Abstracts of Japan, JP 2000 282080, Oct. 10, 2000.
Japan Food Science, pp. 36–42, Apr. 1988 (with partial English translation).

* cited by examiner

*Primary Examiner*—Drew Becker
(74) *Attorney, Agent, or Firm*—Oblon, Spivak, McClelland, Maier & Neustadt, P.C.

(57) ABSTRACT

Provided are oil-cooked or baked potatoes having a small water content, having good texture, having good storage stability, for example, being crispy even after the passage of time and free from deterioration in taste due to a rancid odor of the oil or fat used for them, having good flavor and being excellent in blandness. Oil-cooked or baked potatoes of the present invention comprise 3 to 50 wt. % of an oil or fat composition containing 2 wt. % or less of a monoglyceride and 15 wt. % or greater but less than 50 wt. % of a diglyceride having, as a constituent fatty acid, 15 to 100 wt. % of a ω3 unsaturated fatty acid having less than 20 carbon atoms.

19 Claims, No Drawings

OIL-COOKED OR BAKED POTATOES

BACKGROUND OF THE INVENTION

1. Field of the Invention

The present invention relates to oil-cooked or baked potatoes such as potato chips and fried potatoes.

2. Discussion of the Background

Oil-cooked potatoes such as potato chips and fried potatoes are usually prepared by peeling raw potatoes, slicing them, washing with water, frying in oil and then seasoning with salt or the like. On the other hand, fabricated potato chips are usually prepared by adding water, if necessary, to one or more than one selected from mashed potatoes obtained by heating raw potatoes and then mashing and dehydrated potato materials such as dehydrated potato granules, dehydrated mashed potatoes and dehydrated potato flakes, kneading the mixture, forming a thin dough, cutting out using a die, frying the thus-cut pieces and seasoning with salt or the like.

Fried potatoes are prepared by cutting raw potatoes, cooking them and then seasoning them with salt or the like; or by adding water if necessary, to one more of mashed potatoes obtained by heating raw potatoes and then mashing and dehydrated potato materials such as dehydrated potato granules, dehydrated mashed potatoes and dehydrated potato flakes, kneading the mixture, forming into a desired shape by an extruder or the like, cooking and then seasoning with salt or the like.

It is known that oil-cooked potatoes absorb 30 to 50 wt. % of a frying oil or fat so that they tend to be influenced by the properties of the oil or fat employed. As an oil or fat for cooking snacks including potato chips oils or fats with a single taste such as soybean oil, rapeseed oil, corn oil, palm oil, coconut oil and lard, and natural oils or fats are used after fractionated or hydrogenated according to the using purpose. Oils or fats with a high unsaturation degree are accompanied with the problem that owing to poor storage stability, snacks have a rancid odor due to deterioration of the oils or fats used for them. In order to prevent deterioration of oils or fats during storage, palm oil or hydrogenated oils tend to be used conventionally. These palm oil and hydrogenated oils also involve problems such as too bland of a taste, and the latter one generate a hydrogenation odor upon heating {"Status of Oils or Fats for Snacks and Flavor Retention Techniques" Japan Food Science, April, 36–42 (1988)"}. Although potatoes are fried to rapidly reduce the water content, thereby imparting them with a light texture, potato chips having a markedly reduced water content by frying are accompanied with the problem that slight moisture absorption impairs their crispy texture and deteriorates their flavor considerably.

As a method for obtaining potato chips having a small water content, having good texture capable of keeping its favorable crispy texture after passage of time, and being free from deterioration in flavor due to a rancid odor of the oil or fat used for the proposed is a method of cooking potatoes with an oil composition containing at least 50 wt. % of a diglyceride (Japanese Patent Application Laid-Open No. 10-127230, and Japanese Patent Application Laid-Open No. 11-243857). Potato chips prepared by this method however are somewhat greasy and lacking in blandness. Moreover, these potato chips tend to lack sufficient softness in taste.

An object of the present invention is therefore to provide oil-cooked or baked potatoes which have a small water content; have favorable texture; have good storage stability, for example are capable of keeping a crispy texture after passage of time and are free from a deterioration in flavor due to a rancid odor of oil or fat; and are palatable and bland; and have sufficient softness in taste.

SUMMARY OF THE INVENTION

The present inventors have found that oil-cooked or baked potatoes such as potato chips and fried potatoes prepared using an oil or fat composition containing a monoglyceride and a diglyceride having, among constituent fatty acids, a high content of ω3 unsaturated fatty acids having less than 20 carbon atoms, each in a predetermined amount, are bland and tasty and have good storage stability.

In the present invention there is provided oil-cooked or baked potatoes which comprise 3 to 50 wt. % of an oil or fat composition containing 2 wt. % or less of a monoglyceride and 15 wt. % or greater but less than 50 wt. % of a diglyceride having, as a constituent fatty acid, 15 to 100 wt. % of an ω3 unsaturated fatty acid having less than 20 carbon atoms.

DETAILED DESCRIPTION OF THE PREFERRED EMBODIMENTS

In the present invention, the term "oil-cooked potatoes" mean potato chips and fried potatoes prepared by slicing or cutting raw potatoes and then cooking the pieces with a heated oil or fat; and fabricated potato chips prepared by adding water, if necessary, to one or more of mashed potatoes obtained by heating raw potatoes and then mashing them, and dehydrated potato materials such as dehydrated potato granules, dehydrated mashed potato and dehydrated potato flakes, kneading the mixture, making a dough, forming it into pieces of a desired shape, for example, by using a cutting die and cooking the pieces in a heated oil. Prior to separation of the dough into each piece, a drying step may be inserted.

In the present invention, the term "baked potatoes" means potato chips, fried potatoes and the like prepared by slicing, or cutting raw potatoes and then, baking after applying an oil or fat to the sliced or cut pieces or applying an oil or fat to the sliced or cut pieces after baking; and potato chips prepared by adding water, if necessary, to one or more of mashed potatoes, dehydrated potato granules dehydrated mashed potatoes and dehydrated potato flakes, kneading the mixture, forming it into pieces of a desired shape by an extruder or the like, and baking after applying an oil or fat to the pieces or applying an oil or fat to the pieces after baking.

Within the context of the present invention, the term "potato" refers to an edible starchy tuber produced by certain plants of a genus of the nightshade family, such as the especially the common white potato. In particular potatoes are produced by plants of the genus *Solanum*, of the family Solanaceae. The common white potato is classified as *Solanum tuberosum*. Non-limiting examples of potatoes include Rose, Idaho, Cobbler, Early Ohio, Green Mountain, Hebron, Rural, and Burbank. In addition, the term potato may include the sweet potato belongs to the family Convolvulaceae, classified as *Ipomoea batatas* as well as the wild sweet-potato vine, manroot, or man-of-the-earth classified as *Ipomoea pandurata*. Preferably, potatoes produced by plants of the genus *Solanum*, of the family Solanaceae are used.

The oil or fat composition to be used for cooking of potatoes in the present invention is required to contain a diglyceride in an amount ranging from 15 wt. % (hereinafter be described "%", simply) or greater to less than 50%, with a range of from 20 to 40% being particularly preferred. The diglyceride must contain, as a constituent fatty acid, ω3 unsaturated fatty acids having less than 20 carbon atoms in an amount of 15 to 100%, with 20 to 80% being especially preferred. Within such ranges, the resulting oil composition has good storage stability and heat stability, and potatoes cooked therewith have a good taste, sufficient blandness and good storage stability. The term "ω3 unsaturated fatty acid" as used herein means an unsaturated fatty acid having a first unsaturated bond at the third carbon atom from the ω-position and at the same time having at least two unsaturated bonds. Preferred is α-linolenic acid. The diglyceride having such constituent fatty acids is recognized to be excellent in body-fat burning effects. The oil-cooked or baked potatoes therefore have excellent body-fat burning effects.

The remaining constituent fatty acids of the diglyceride are saturated or unsaturated fatty acids having 12 to 22 carbon atoms. It is preferred that at least 70%, especially at least 80% of all the constituent fatty acids are unsaturated fatty acids having 3 or less carbon-carbon double bonds.

The oil or fat composition to be used for cooking of potatoes in the present invention is required to contain 2% or less of a monoglyceride from the viewpoints of taste, smoking control and heat stability. When present, the monoglyceride content is preferably 1.5% or less, especially 1% or less. More preferably the monoglyceride content is less than 0.5%, more preferably less than 0.25%, even more preferably 0%.

The constituent fatty acids of the monoglyceride are preferably similar to those of the diglyceride.

Another main component of the oil or fat composition to be used for cooking of potatoes in the present invention is a triglyceride. Examples of the triglyceride include vegetable and animal oils or fats, more specifically, rapeseed oil, sunflower oil, corn oil, soybean oil, rice oil, safflower oil, palm oil, coconut oil, beef tallow, linseed oil, perilla oil and fish oil. It is also possible to use them after fractionation or adjustment of a melting point by hydrogenation or ester change reaction.

Of all the constituent fatty acids of the oil or fat composition, the content of the fatty acids having 4 or greater carbon-carbon double bonds is preferably 5% or less, especially 2% or less. Most preferred is, however, the content of substantially 0%, at which oil deterioration can be prevented.

An antioxidant such as tocopherol, ascorbate ester or natural antioxidant component may be used in combination in order to prevent deterioration in the flavor of the oil-cooked or baked potatoes of the present invention. Ascorbate esters include palmitate esters and stearate esters, while natural antioxidant components include vegetable extracts such as extracts from herbs such as tea and rosemary and those from leaves or roots of peach. The antioxidant is preferably added in an amount of 0.005 to 2%, especially 0.04 to 2% in the oil or fat composition.

A method of preparing oil-cooked or baked potatoes by using such an oil or fat composition is different depending on the kind of the intended product. Potato chips are preferably prepared by slicing raw potatoes and then frying the slices in the oil or fat composition or by frying or baking after applying the oil or fat composition to the slices. A step of applying the oil or fat composition further may be inserted after baking.

Fabricated potato chips are prepared by adding water if necessary, to one or more of mashed potato obtained by heating raw potatoes and then mashing and dehydrated potato materials such as dehydrated potato granules, dehydrated mashed potato and dehydrated potato flakes, kneading the mixture to form a dough of potato chips and then frying or baking. Upon formation of the dough of potato chips, the oil or fat composition may be added. Baking may be conducted after frying the dough of potato chips or applying thereto the oil or fat composition. Alternatively, the oil or fat composition may be applied to the potato chips after baking.

It is preferred to add a starch or modified starch to the fabricated potato chips from the viewpoint of improving texture.

As the starch or modified starch, usable here is that made from raw materials such as potatoes, corns, waxy corns, wheat and tapioca. Examples of the modified starch include dextrin, acid-treated starch, oxidized starch, dialdehyde starch, acetylated starch, carboxymethyl starch, hydroxyethyl starch, phosphorylated starch, cross-linked starch, α-starch and decomposed starch.

As the starch or modified starch, at least two of the above-exemplified ones may be used in combination. The content of 3 to 50%, especially 3 to 20% in potato flakes is preferred for not impairing the good potato flavor. As subsidiary materials seasonings such as salt and sugar, emulsifier, baking powder, flavor and colorant may be added needed.

Fried potatoes, on the other hand, include those prepared by cutting raw potatoes and then cooking them: and those obtained by adding water, if necessary, to one or more of mashed potatoes obtained by heating raw potatoes and then mashing them and dehydrated potato materials such as dehydrated potato granules, dehydrated mashed potato and dehydrated potato flakes, kneading the mixture, forming the kneaded mass into pieces of a desired shape by an extruder or the like, and cooking. Between the latter two steps, a drying or freezing step may be inserted.

Similar to the fabricated potato chips, a starch or modified starch is preferably added to improve the texture.

When 7–10% of such a starch is beforehand mixed and kneaded with dough of potato chips or fried potatoes which have been formed into a desired shape the dough is significantly improved in extensibility and reduced adhesion to the extruder, so that its working efficiency can be increased.

In the oil-cooked potatoes of the present invention, incorporation of such an oil or fat composition in an amount of 3 to 50%, preferably 5 to 40%, especially 10 to 35% is necessary. In the case of baking, it is possible to freely adjust the oil or fat content and from the viewpoints of good taste, the content is preferably 5 to 40%, more preferably 10 to 30%. When low oil or fat potatoes are made by baking in consideration of health, the oil or fat content can be adjusted readily for example, at 7 to 25%, preferably 7 to 18%.

As the oil-cooked or baked potatoes of the present invention, potato chips and fried potatoes are preferred, with fabricated potato chips being especially preferred.

Having generally described this invention, a further understanding can be obtained by reference to certain specific examples which are provided herein for purposes of illustration only and are not intended to be limiting unless otherwise specified.

EXAMPLES

Preparation Examples of an Oil or Fat Composition

After 3.5 kg of linseed oil, 3.5 kg of distilled water and 5 g of a commercially available lipase preparation "Lipase OF", trade name; product of Meito Sangyo Co. Ltd.) were mixed, the mixture was rested at 36° C. for 5 hours under thorough stirring. By centrifugation of the reaction mixture, a fatty acid derived from linseed oil was obtained. In the presence of a commercially available lipase preparation ("Lipozyme 3A", trade name; product of Novo A/S) to which 1,3-selective lipase has been immobilized, the fatty acid obtained above and glycerin were mixed at a molar ratio of 2:1 and reacted at 50° C. under reduced pressure. Then, the lipase preparation was filtered out, followed by molecular distillation and purification, whereby Oil or fat composition A containing 0.07% of tocopherol and 0.03% of ascorbyl palmitate ester was prepared.

In a similar manner to the above-described preparation example except for the use of perilla oil instead of linseed oil, Oil or fat composition B was prepared.

In a similar manner to the above-described preparation example except for the use of rapeseed oil instead of linseed oil, Oil or fat composition C was prepared.

By using these Oil or fat compositions A to C, the following oil or fat compositions were prepared.

Oil or fat composition 1: 40% of Oil or fat composition A and 60% of rapeseed oil
Oil or fat composition 2: 40% of Oil or fat composition B and 60% of rapeseed oil
Oil or fat composition 3: 40% of Oil or fat composition C and 60% of rapeseed oil
Oil or fat composition 4: 100% of linseed oil
Oil or fat composition 5: 100% of rapeseed oil In Table 1, shown in the constitution of each of Oil or fat compositions 1 to 5 and the composition of the constituent fatty acids of the diglyceride.

TABLE 1

| Oil or fat compositions | | Invention Products | | Comparative Products | | |
|---|---|---|---|---|---|---|
| | | 1 | 2 | 3 | 4 | 5 |
| Constitution of oil or fat composition | monoglyceride | 0.3 | 0.3 | 0.3 | 0.1 | 0.1 |
| | diglyceride | 34.5 | 35.3 | 34.6 | 1.0 | 1.0 |
| | triglyceride | 65.2 | 64.4 | 65.1 | 98.9 | 98.9 |
| composition of constituent fatty acids of diglyceride | C16:0 | 4.7 | 5.6 | 3.9 | 6.0 | 3.9 |
| | C18:0 | 2.7 | 1.5 | 1.8 | 4.0 | 1.8 |
| | C18:1 (ω9) | 43.5 | 12.8 | 57.9 | 22.0 | 57.9 |
| | C18:2 (ω6) | 19.1 | 16.4 | 21.8 | 15.0 | 21.8 |
| | C18:3 (ω3) | 27.6 | 61.6 | 11.3 | 52.0 | 11.3 |

Example 1

Peeled potatoes were cut into slices of 1.5 mm thick and then, washed with water to remove the starch and eluate from their surfaces. After wiping off water, they were fried in each of Oil or fat compositions 1 to 5 at 190° C. for 3 minutes. Three hours after frying was started, potato chips {oil or fat content: 33 to 35%} thus obtained were evaluated for their flavor and blandness based on the following criteria.

[Flavor]

Potato chips were subjected to a 5-stage organoleptic evaluation ranked on a scale from 1 to 5 as indicated below.
5: free of a rancid or offensive odor
4: having a slight rancid or offensive odor
3: having a weak rancid or offensive odor
2: having a rancid or offensive odor or a strange taste
1: having a remarkable rancid or offensive odor or a strange taste An average of 10 experts was used as a score and a score of 4 or greater were evaluated good.

[Blandness]

Potato chips were subjected to a 5-stage organoleptic evaluation ranked on a scale from 1 to 5 as indicated
5: not greasy but bland
4: somewhat bland and not greasy
3: neither greasy nor bland
2: somewhat greasy and not bland
1: greasy and not bland An average of 10 experts was used as a score and those having a score of 4 or greater were evaluated good.

The evaluation results are shown in Table 2. Even after passage of long hours after frying, the potato chips of the present invention were found to have good flavor and be bland.

TABLE 2

| | Oil or fat compositions | Flavor | Blandness |
|---|---|---|---|
| Invention Products | 1 | 4.2 | 4.0 |
| | 2 | 4.0 | 4.2 |
| Comparative Products | 3 | 3.5 | 2.0 |
| | 4 | 1.5 | 4.0 |
| | 5 | 3.5 | 1.0 |

Example 2

To 100 g of potato flakes, 35 g of water and 10 g of each Oil or fat compositions 1 to 5 were added. After uniform dispersion of water, the mixture was sheeted in a roller to form a dough of potato chips having a thickness of 0.6 mm. The resulting dough was cut out into pieces (each, a disc shape of 5 cm in diameter, about 2 g) and then, 25 g of each of Oil or fat compositions 1 to 5 was applied to the pieces. They were baked in an oven of 190° C. for 5 minutes. In Table 3, flavor and blandness of the potato chips obtained using each of the oil or fat compositions are shown. The invention products exhibited good results in both.

TABLE 3

| | Oil or fat compositions | Flavor | Blandness |
|---|---|---|---|
| Invention Products | 1 | 4.4 | 4.4 |
| | 2 | 4.0 | 4.6 |
| Comparative Products | 3 | 3.7 | 2.9 |
| | 4 | 2.4 | 3.1 |
| | 5 | 3.6 | 1.8 |

Example 3

To the dough of potato chips cut into pieces in Example 2, 10 g of each of Oil or fat compositions 1 to 5 was applied by a brush. After baking in an oven of 190° C. for 5 minutes, 15 g of each of Oil or fat compositions 1 to 5 was applied again. As shown in Table 4 each of the invention products was found to be excellent in flavor of potato chips and blandness.

TABLE 4

| | Oil or fat compositions | Flavor | Blandness |
|---|---|---|---|
| Invention Products | 1 | 4.3 | 4.2 |
| | 2 | 4.2 | 4.4 |

TABLE 4-continued

|  | Oil or fat compositions | Flavor | Blandness |
| --- | --- | --- | --- |
| Comparative Products | 3 | 3.6 | 2.5 |
|  | 4 | 2.5 | 2.8 |
|  | 5 | 3.7 | 1.6 |

Example 4

Peeled potatoes were cut into slices of 1.5 mm thick and then, washed with water to remove the starch and eluate from their surfaces. After wiping off water, each of oil or fat compositions 1 to 5 was applied, to their surfaces, in an amount of 20% of the sliced potatoes. Then, they were baked in an oven of 190° C. for 6 minutes. After baking, 10% of each of Oil or fat compositions 1 to 5 was applied to them again. As shown in Table 5, the potato chips of the present invention were found to be excellent in flavor and blandness.

TABLE 5

|  | Oil or fat compositions | Flavor | Blandness |
| --- | --- | --- | --- |
| Invention Products | 1 | 4.3 | 4.1 |
|  | 2 | 4.1 | 4.1 |
| Comparative Products | 3 | 3.7 | 2.6 |
|  | 4 | 2.4 | 2.8 |
|  | 5 | 3.8 | 1.5 |

Example 5

To a 90 g of potato flakes and 10 g of α-starch derived from tapioca, 35 g of water was added. After uniform dispersion of water, the mixture was sheeted out in a roller to form a dough of potato chips having a thickness of 0.6 mm. The resulting dough was cut out into pieces (each, a disk shape of 5 cm in diameter, about 2 g) and then, the pieces were fried continuously in each of Oil or fat compositions 1 to 5 at 190° C. for 20 seconds. As is apparent from Table 6, the potato chips (oil or fat content: 33 to 35%) of the present invention had good flavor and blandness even three hours after frying was start.

Table 6

TABLE 6

|  | Oil or fat compositions | Flavor | Blandness |
| --- | --- | --- | --- |
| Invention Products | 1 | 4.2 | 4.2 |
|  | 2 | 4.0 | 4.0 |
| Comparative Products | 3 | 3.8 | 2.7 |
|  | 4 | 2.7 | 2.9 |
|  | 5 | 3.8 | 1.7 |

Example 6

To 85 g of potato flakes and 15 g of a α-starch derived from waxy corn, 35 g of water and 10 g of each of Oil or fat compositions 1 to 5 were added. After uniform dispersion of water, the mixture was sheeted out in a roller to form a dough of potato chips having a thickness of 0.6 mm. The resulting dough was cut out into pieces (each, a disc shape of 5 cm in diameter, about 2 g). 10 g of each of Oil or fat compositions 1 to 5 was then applied further to the pieces, followed by baking in an oven of 190° C. for 5 seconds. As is apparent from Table 7 the potato chips of the present invention thus obtained had a good flavor and blandness.

TABLE 7

|  | Oil or fat compositions | Flavor | Blandness |
| --- | --- | --- | --- |
| Invention Products | 1 | 4.4 | 4.2 |
|  | 2 | 4.1 | 4.2 |
| Comparative Products | 3 | 3.8 | 2.9 |
|  | 4 | 2.8 | 3.0 |
|  | 5 | 3.9 | 2.0 |

Example 7

A raw potato (Irish Cobbler) in its jacket was washed with water and cut lengthways into six comb-like pieces. They were soaked in water for 15 minutes. After wiping off water from their surface, they were continuously fried at 180° C. for 6 minutes in each of Oil or fat compositions 1 to 5. As shown in Table 8, the fried potatoes of the present invention were excellent in each of flavor and blandness.

TABLE 8

|  | Oil or fat compositions | Flavor | Blandness |
| --- | --- | --- | --- |
| Invention Products | 1 | 4.2 | 4.6 |
|  | 2 | 4.1 | 4.4 |
| Comparative Products | 3 | 3.7 | 3.0 |
|  | 4 | 2.8 | 3.3 |
|  | 5 | 3.7 | 2.2 |

INDUSTRIAL APPLICABILITY

The oil-cooked or baked potatoes of the present invention have a small water content, have good texture, have good storage stability, for example, being crispy even after the passage of time and free from deterioration in flavor due to a rancid odor of the oil or fat use for them, have good flavor and are excellent in blandness.

Obviously, numerous modifications and variations of the present invention are possible in light of the above teachings. It is therefore to be understood that within the scope of the appended claims, the invention may be practiced otherwise than as specifically described herein.

This application is based on Japanese patent application 2000-337330 filed in the Japanese Patent Office on Nov. 6, 2000, the entire contents of which are hereby incorporated by reference.

What is claimed as new and desired to be secured by Letters Patent of the United States is:

1. An oil-cooked or baked potatoes each of which comprises 3 to 50 wt. % of an oil or fat composition comprising 2 wt. % or less of a monoglyceride and 15 wt. % or greater but less than 50 wt. % of a diglyceride having, as a constituent fatty acid, 15 to 100 wt. % of an ω3 unsaturated fatty acid having less than 20 carbon atoms.

2. The oil-cooked or baked potato of claim 1, wherein said ω3 unsaturated fatty acid having less than 20 carbon atoms is α-linolenic acid.

3. The oil-cooked or baked potatoes of claim 1, wherein said oil-cooked potatoes is selected from the group consisting of potato chips or fried potatoes and a mixture thereof.

4. The oil-cooked or baked potatoes of claim 1, wherein said oil or fat composition contains 20 to 40% of said diglyceride.

5. The oil-cooked or baked potatoes of claim 1, wherein said ω3 unsaturated fatty acid having less than 20 carbon atoms is present in an amount of 20 to 80% by weight.

6. The oil-cooked or baked potatoes of claim 1, wherein at least 70% of all of said constituent fatty acids of said diglyceride are unsaturated fatty acids having 3 or less carbon-carbon double bonds.

7. The oil-cooked or baked potatoes of claim 1, wherein said oil or fat composition further comprises an antioxidant.

8. The oil-cooked or baked potato of claim 1, wherein at least 70% of all of said constituent fatty acids of said diglyceride are unsaturated fatty acids having 3 or less carbon-carbon double bonds.

9. The oil-cooked or baked potato of claim 1, wherein said potato is an oil-cooked potato comprising said oil or fat composition in an amount of 3 to 50% by weight.

10. The oil-cooked or baked potato of claim 1, wherein said potato is an oil-cooked potato comprising said oil or fat composition in an amount of 5 to 40% by weight.

11. The oil-cooked or baked potato of claim 1, wherein said potato is an oil-cooked potato comprising said oil or fat composition in an amount of 10 to 35% by weight.

12. The oil-cooked or baked potato of claim 1, wherein said potato is a baked potato comprising said oil or fat composition in an amount of 5 to 40% by weight.

13. The oil-cooked or baked potato of claim 1, wherein said potato is a baked potato comprising said oil or fat composition in an amount of 10 to 30% by weight.

14. The oil-cooked or baked potato of claim 1, wherein said potato is a baked potato comprising said oil or fat composition in an amount of 7 to 25% by weight.

15. The oil-cooked or baked potato of claim 1, wherein said potato is a baked potato comprising said oil or fat composition in an amount of 7 to 18% by weight.

16. A method of preparing an oil-cooked or baked potato comprising heating a potato in contact with an oil or fat composition, wherein said oil or fat composition comprises 2 wt. % or less of a monoglyceride and 15 wt. % or greater but less than 50 wt. % of a diglyceride having, as a constituent fatty acid, 15 to 100 wt. % of an ω3 unsaturated fatty acid having less than 20 carbon atoms, wherein said oil-cooked or baked potato comprises 3 to 50 wt. % of said oil or fat composition.

17. The method of claim 16, wherein said potato is selected from the group consisting of raw potato and mashed potato.

18. The method of claim 16, wherein said heating is by cooking said potato in said oil or fat composition.

19. The method of claim 16, wherein said heating is by baking said potato in contact with said oil or fat composition.

* * * * *